Dec. 19, 1933. T. W. GREENE 1,939,772
METHOD OF MAKING A WELDED PIPE JOINT
Filed March 21, 1930
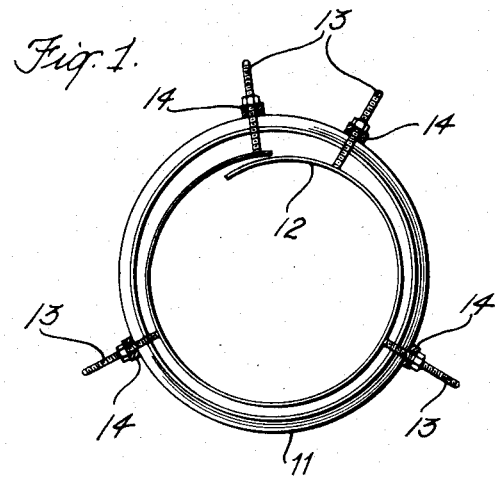
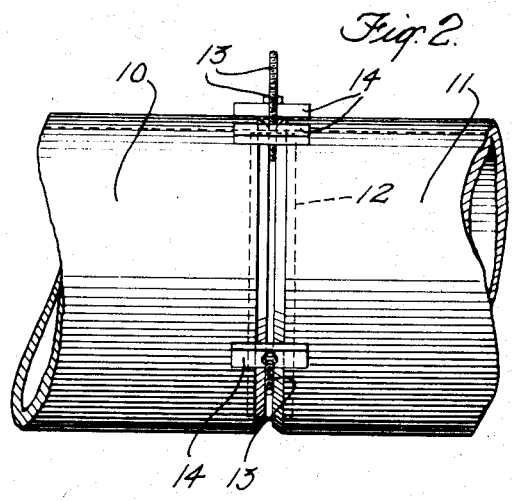
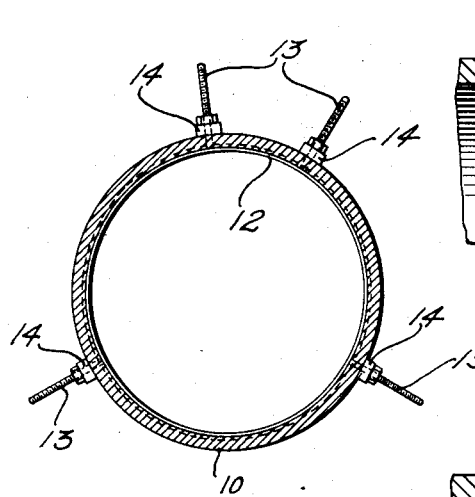
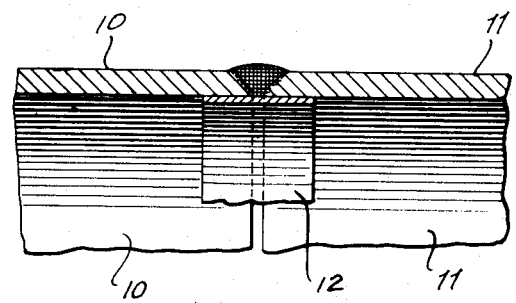
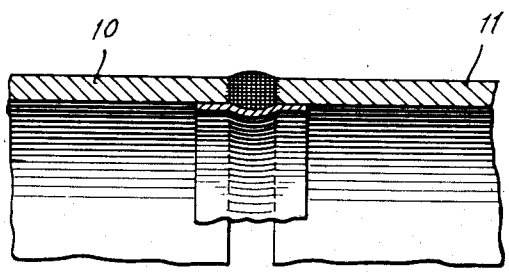
Thomas W. Greene, INVENTOR,
BY
Byrnes Townsend & Potter, ATTORNEYS.

Patented Dec. 19, 1933

1,939,772

UNITED STATES PATENT OFFICE 1,939,772

METHOD OF MAKING A WELDED PIPE JOINT

Thomas W. Greene, New York, N. Y., assignor to The Linde Air Products Company, a corporation of Ohio Application March 21, 1930. Serial No. 437,903

13 Claims. (Cl. 113—112)

This invention pertains in general to autogenous welding as employed to join pipe sections and the abutting edges of metal sheets, and more specifically to a liner and a method of employing it in making such joints whereby many difficulties encountered heretofore are overcome.

When joining pipe ends by means of the ordinary butt weld, the ends are usually beveled and abutted and then the circumferential V-groove between the ends is filled with weld metal. If, in doing so, the point of fusion is carried to the bottom of the V-groove, some of the molten metal will run through the joint and form bunches or globules on the inside of the pipe. These are objectionable because they impede the flow of fluid through the pipe and also the movement of cleaning devices. If the point of fusion is not carried to the bottom of the V-groove the joint is weak and frequently fails. Therefore, one object of this invention is to provide means for carrying the point of fusion to the bottom of the V-groove without allowing molten weld metal to escape therethrough.

When joining pipe ends by means of a butt weld more or less trouble is encountered in maintaining the ends in alignment during the welding operation. The ends are frequently supported by a timber and then held by temporary clamps but this is unsatisfactory as they must be realigned frequently. Therefore, another object of this invention is to provide improved means for holding the ends in alignment during the welding operation.

In order to prevent relative movement between the ends resulting from expansion and contraction of the heated metal during welding, the joint is usually "tacked" or joined in several spots therearound before the main weld is started. This "tacking" operation is expensive and consequently undesirable. Therefore, another object of this invention is to provide means for holding the ends in position for welding without "tacking".

Many of the troubles encountered in welding the abutting edges of flat metal sheets are similar in character to those encountered in welding large pipes. Therefore, another object of my invention is to provide improved means for forming welded joints between the abutting edges of flat metal sheets.

Other aims, objects, and novel features, will be apparent from the following description and the accompanying illustration in which:

Fig. 1 is an end view of one pipe section with my improved liner spaced from the inner surface thereof ready to have the second section moved into position for welding;

Fig. 2 is a side view of the pipe joint after the second section has been moved into welding position and clamped in place by means of my improved liner;

Fig. 3 is an end view of the same showing the liner in welding position,

Fig. 4 is a sectional view of the completed weld, and;

Fig. 5 is a sectional view of an unbeveled welded joint with grooved liner.

In practicing the process by which I obtain the objects of this invention I employ a liner, the dimensions and form of which may vary considerably according to the size and shape of the joint with which it is used. The dimensions given are those of a liner found suitable for use in making joints in 12 in. pipe sections such as 10 and 11. The liner comprises a strip of metal 12 such as iron or steel from 1 to 1½ inches wide and from $\frac{1}{16}$ to $\frac{3}{32}$ of an inch thick with a plurality of threaded studs 13 having one end of each welded to the outer surface of the liner at spaced points along the center thereof so that the studs extend radially outward. The length of the liner is about ⅛ in. less than the circumference of the inside of the pipe with which it is used. The studs are $\frac{7}{16}$ in. in diameter and 3½ in. long but both of these dimensions may be varied according to the size and thickness of the pipe with which it is used.

In preparing the pipe sections 10 and 11 for welding the ends are beveled in the usual manner and the liner is placed in the end of one section and held either manually or by means of the studs 13 so that the metal strip 12 is spaced from the inside of the pipe where it will not interfere with the second section which is now moved into welding position wherein the ends of the pipe sections are in abutting relation and separated by the studs 13. A washer of large diameter or, what is more convenient, a metal strap 14, ⅜ in. by ½ in. by 3 in. having a ¼ in. hole through the center thereof is placed over each stud so it spans the joint. Each strap is followed by a nut which is tightened until the liner is firmly clamped to the inside of the pipe sections 10 and 11 over the inside of the joint therebetween, and the pipe sections are firmly held together in welding position. The joint is completed by filling the groove between the ends 10 and 11 with weld metal and, at the same time, fusing the ends of the pipe sections and the metal strip 12 together. When, during the welding operation, one of the studs 13 is encountered it is melted off by means of the welding flame at a point within the groove and the outer end is discarded.

In forming a weld in this manner the liner holds the ends of the pipe sections in alignment against any tendency to relative movement therebetween resulting from thermal expansion and contraction of the metal and, therefore, it is unnecessary to resort to the expensive expedient of "tacking" the joint in several places before starting the main weld. This alone results in economies running as high as 50% in some cases.

When my improved liner is used the welding operation may be performed more rapidly and with better fusion. In making the ordinary butt weld the bottom of the beveled edges are brought close together to prevent the escape of molten weld metal, but it is then difficult to secure good fusion in the sharp corner at the bottom of the groove. When my improved liner is used the bottom of the beveled edges are held apart by the studs 13 thereby eliminating the sharp corner so complete fusion may be readily secured the full depth of the groove and, at the same time, the metal strip 12 prevents the molten weld metal from escaping through the bottom of the joint. Also, the heat that usually escapes through the open bottom of the groove is now conserved and this effects still further economy. Furthermore, as lack of fusion to the bottom of the groove is the major defect in weld quality, welds made with this liner are of better quality and greater strength on account of better fusion.

As the point of fusion is carried to the very bottom of the groove, and the metal strip 12 is welded to the joint, it is not necessary to reinforce the weld by building up the weld metal above the top of the groove in order to gain increased strength, as it has been found that when the weld metal is flush with the top of the groove the strength of the joint is greater than that of the surrounding metal. Therefore, when my improved liner is used, the welded joint is stronger and neater in appearance.

Although "tacking" is not ordinarily employed when my improved liner is used, there are times when conditions are such that it may be used to advantage. In some cases short rivets or short pieces of bar iron may be used in place of the studs 13, and the ends of the liner strip 12 may be "tacked" to the joint after it has been expanded against the inner surface of the pipe. In other cases the pipe joint and liner may be "tacked" at spaced points along the joint in the usual manner.

Under conditions where either a liner or globules of weld metal on the inside of the pipe are undesirable, the liner may be grooved along the center so that it is not in contact with the edges of the joint and then the ends of the pipe may be joined without joining them to the liner which is removed after the joint has been completed. In this way a joint is formed that is smooth both inside and out. Either the grooved or straight liner may or may not be welded to the pipe according to the type of joint desired.

When joining pipe sections by means of autogenous welding, the ends to be joined have been beveled heretofore so that the point of fusion could be carried to the bottom of the joint without allowing much of the molten weld metal to escape. By the use of my improved liner the joint separation may be increased to a point where beveling is unnecessary as the liner prevents the escape of molten weld metal and the increased separation allows the point of fusion to extend to the very bottom of the joint. This form of joint, shown in Fig. 5, is more economical than the beveled butt welded joints known heretofore.

While the liner strip 12 is of iron in most cases, alloys having a high tensile strength may be employed in combination with welding rods of similar material for the purpose of securing joints of unusual strength. Various other metals and alloys may be used according to requirements.

The width, thickness, and length of the strip 12 may be varied to meet the requirements of different classes and sizes of pipe, or it may be left straight when used with joints between flat sheets. The size, number, length and position of the studs 13 may also be varied, and they may be attached to the strip 12 by any suitable means other than welding. Also, the dimensions of the straps 14 may be varied or other equivalent means may be employed. Furthermore, equivalent means and materials may be substituted for those designated without departing from the spirit of the invention or sacrificing any of the rights thereunder.

I claim:

1. The process of joining the ends of pipe sections which comprises inserting a split-ring liner therein; bringing said sections into end to end spaced welding position, expanding said liner against the inner surface of said sections over the joint between the ends thereof and maintaining the ends of the sections in said spaced welding position by means of solid fusible metal spacing means; and then welding said ends, said spacing means and said liner together.

2. The process of joining the ends of pipe sections which comprises inserting a liner therein having a plurality of studs extending outwardly therefrom; bringing said sections together so that the ends thereof are separated by said studs; expanding said liner into contact with the inner wall of said sections; and then welding said ends and said liner together.

3. The process of joining the ends of pipe sections which comprises inserting a liner therein having a plurality of studs extending outwardly from points along the center thereof so that said ends are separated by said studs and the gap therebetween is closed by said liner; and then joining said ends and said liner by means of autogenous welding, at the same time removing the outer end of said studs as they are encountered.

4. The process of joining the ends of pipe sections which comprises inserting a liner therein having a plurality of studs attached thereto and extending outwardly from points along the center line thereof; positioning said ends in axial alignment so that they are separated by said studs and so that said liner lies against the inner surface thereof and closes the gap therebetween; and then joining said ends by means of autogenous welding.

5. The process of joining the ends of pipe sections which comprises beveling said ends; inserting a liner therein having a plurality of studs extending outwardly therefrom; moving one of said ends toward the other until said studs are clamped therebetween; placing a strap and a nut on each stud and tightening the nuts until said ends are held in alignment between said liner and said straps; and then welding said ends together and to said liner, at the same time melting off said studs as they are encountered.

6. The process of forming single V welds between the abutting edges of metal plates which comprises clamping a metal strip over the bottom of the joint between said edges by means of metal rods extending upward through the joint therebetween; and then joining said edges and said metal strip by means of autogenous welding.

7. A liner for use in making welded pipe joints comprising a strip of iron adapted for being clamped over the inside of said joint by a plurality of studs secured at intervals along said strip and adapted to extend outward through said joint and to maintain a substantial uniform distance between the edges to be joined.

8. A liner for use in making welded pipe joints comprising a split ring of metal having a plurality of studs extending outwardly from the outer surface thereof.

9. A liner for use in making a welded pipe joint consisting of a split ring of metal having a plurality of threaded studs extending outwardly from spaced points along the center line of the outer surface thereof; a strap on each of said studs adapted to span said joint; and a nut on each of said studs over each of said straps to clamp said ring to the inside of said joint.

10. A liner for use in butt-welding pipe sections end to end, such liner comprising a split metal ring adapted to be inserted in place against the inside of the pipe sections overlapping the opposed ends of the latter, said ring carrying studs located at intervals along and extending outwardly from the outer surface of the ring and of sufficient length to project through the space between said opposed ends and a substantial distance beyond the outside surfaces of the pipe sections so as to maintain said opposed ends in substantialy uniformly spaced relation for welding.

11. A liner for use in welding pipe sections end to end, such liner comprising a sheet metal ring adapted to be inserted in place against the inner sides of the pipe sections overlapping the opposed ends of the latter, said ring carrying rod-like studs located at intervals along and extending radially outwardly from the outer surface of said ring and of sufficient length to project into the space between said opposed ends, so as to maintain said opposed ends in substantially uniformly spaced relation for welding.

12. The process of joining opposed edges of metal plates which comprises providing a metal strip having a row of metal studs projecting from one face thereof; abutting said edges against opposite sides of said row of studs and clamping said strip firmly against contiguous sides of said plates to hold said edges apart a uniform distance and in alinement; and then depositing weld metal between said edges and projecting portions of said studs.

13. The process of joining pipe sections end to end which comprises positioning the sections end to end with a split-ring liner inside bridging the joint between the sections; expanding the liner into contact with the sections; and maintaining the sections equally spaced throughout the circumference of the joint by means of solid fusible metal spacing means therebetween while welding said sections, said spacing means and said liner together.

THOMAS W. GREENE.